(12) United States Patent
Baker

(10) Patent No.: US 7,199,488 B1
(45) Date of Patent: Apr. 3, 2007

(54) TELEMETRY POWER SYSTEM

(76) Inventor: David A. Baker, 4251 S. Natches Ct., Unit C, Englewood, CO (US) 80110

( * ) Notice: Subject to any disclaimer, the term of this patent is extended or adjusted under 35 U.S.C. 154(b) by 358 days.

(21) Appl. No.: 10/965,423

(22) Filed: Oct. 14, 2004

(51) Int. Cl.
*H02J 1/10* (2006.01)
(52) U.S. Cl. .................................. 307/43; 340/870.07
(58) Field of Classification Search ................ 307/43; 320/119, 101, 118, 166; 340/870.07, 429.16; 323/225
See application file for complete search history.

(56) References Cited

U.S. PATENT DOCUMENTS

| | | | |
|---|---|---|---|
| 4,122,396 A | 10/1978 | Grazier et al. | |
| 4,980,574 A | 12/1990 | Cirrito | |
| 5,063,340 A * | 11/1991 | Kalenowsky | 320/166 |
| 5,235,232 A | 8/1993 | Conley et al. | |
| 5,572,108 A | 11/1996 | Windes | |
| 5,592,074 A | 1/1997 | Takehara | |
| 5,821,733 A * | 10/1998 | Turnbull | 320/116 |
| 6,100,665 A | 8/2000 | Alderman | |
| 6,166,515 A | 12/2000 | Barde et al. | |
| 6,194,793 B1 | 2/2001 | Fisher, Jr. | |
| 6,362,597 B2 * | 3/2002 | Leppo et al. | 320/116 |
| 2002/0158584 A1 | 10/2002 | Cordaro | |
| 2004/0053082 A1 | 3/2004 | McCluskey et al. | |
| 2004/0183673 A1 * | 9/2004 | Nageli | 340/539.13 |

\* cited by examiner

*Primary Examiner*—Daniel Swerdlow
*Assistant Examiner*—Sigmund Tang

(57) ABSTRACT

A long-life telemetry power storage and delivery system includes a power bus electrically connected through a voltage regulator to a wireless communications unit operable for periodic high-current transmissions. The power bus is connected to a direct power source and at least three power storage sources. The direct power source includes at least one solar panel. The power storage sources include: (1) a primary, low-voltage, non-rechargeable battery; (2) a secondary, low-voltage, rechargeable battery; and (3) a set of high capacity capacitors. To provide a long life to the system, current limiting resistors are interposed between the power bus and the primary and secondary batteries, such that high current requirements of a transmission are supplied by the set of capacitors rather than the batteries.

11 Claims, 4 Drawing Sheets

TELEMETRY POWER SYSTEM

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to a portable, self-contained, low-voltage power system for a transportable telemetry unit, and more particularly to an improved telemetry power system that provides flexibility to optimize power requirements while providing a long-lived power storage system.

(2) Background Information

The tracking and monitoring of various cargo and other shipments by industry is becoming a highly desirable service to both customers and the shipping industry. With greater use of global computer networks, the consuming public demands greater accuracy and tracking capabilities for various products and shipments. One example is the railroad industry. The capability of tracking and monitoring a particular freight car and shipment has become quite valuable to this industry.

It was for this reason that the inventor herein devised a portable self-contained track unit and GPS tracking system, which is the subject of the inventor's U.S. Pat. No. 6,339,397. One of the major features of that invention was the use of data transmissions over a wireless communications network to transmit pertinent data as to the position and condition of the railroad car and/or the associated shipment.

While there are other self-container vehicular communications systems known and used in the market, they typically use a long-life Lithium battery, or a rechargeable secondary battery, such as a Ni—MH or Li-Ion battery. While such power systems are fine for a period of time, telemetry systems typically require very long lifetimes without human intervention following installation of the power supply. In addition, the low-voltage telemetry systems of such tracking and monitoring units usually require high-current transmissions over a wireless communications channel, such as cellular or satellite communications. The high current draw of such transmissions is directly opposed to long battery life.

BRIEF SUMMARY OF THE INVENTION

It is therefore a general object of the present invention to provide an improved long-life power storage and delivery system for a portable self-contained telemetry unit.

A further object of the present invention is to provide a long-life power storage system, which removes the high current draw of wireless communications transmissions from the usage profile of a battery, to thereby increase the battery life and permit a reduction in battery size.

Yet another object is to provide a long-life power storage and delivery system which is flexible for configurations to optimize power requirements of a variety of low voltage telemetry applications.

These and other objects will be apparent to those skilled in the art.

The long-life telemetry power storage and delivery system of the present invention includes a power bus electrically connected through a voltage regulator to a wireless communications unit operable for periodic high-current transmissions. The power bus is connected to a direct power source and at least three power storage sources. The direct power source includes at least one solar panel. The power storage sources include: (1) a primary, low-voltage, non-rechargeable battery; (2) a secondary, low-voltage, rechargeable battery; and (3) a set of high capacity capacitors. To provide a long life to the system, current limiting resistors are interposed between the power bus and the primary and secondary batteries, such that high current requirements of a transmission are supplied by the set of capacitors rather than the batteries.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
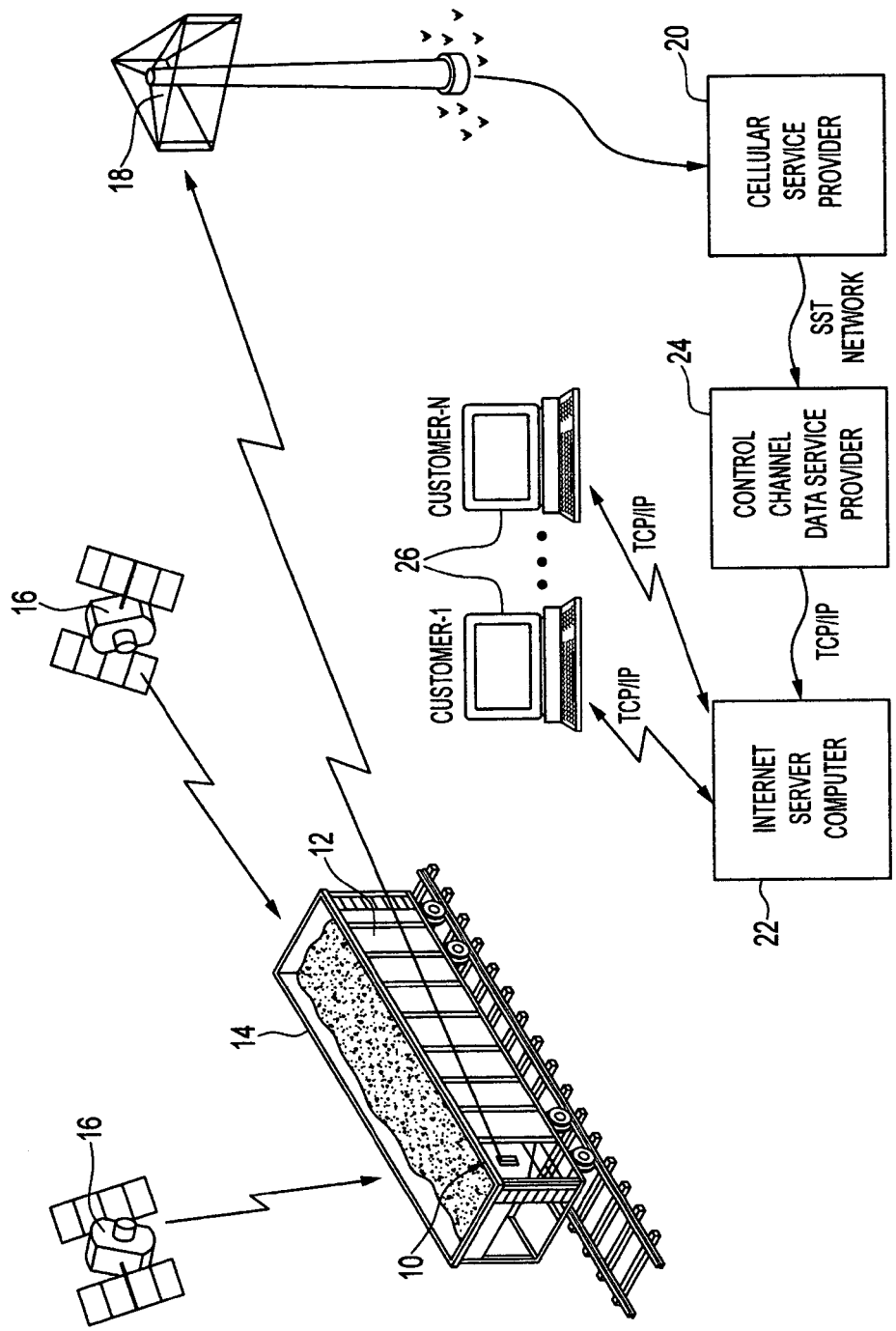
FIG. 1 is a pictorial schematic view of a portable self-contained tracking unit using the power system of the present invention.

Referring now to the drawings, in which similar or corresponding parts are identified with the same reference numeral, and more particularly to FIG. 1, a tracking and monitoring unit using the power system of the present invention is designated generally at 10, and is shown mounted on a vertical sidewall 12 of a railroad freight car 14. Obviously, a tracking and monitoring unit 10 may be attached to a wide variety of objects that are desired to by tracked, such as tractor-trailer units, cargo containers, and other objects and shipments.

Tracking information is received from a plurality of GPS satellites 16 and processed by tracking unit 10. A data packet is then transmitted via cellular telephone to a cell tower 18, thence by a cellular service provider 20 to an Internet-connected server computer 22. As noted above, a satellite telemetry communication system may be used as an alternative to the cellular telephone system.

In one embodiment, tracking information in the data packet is routed from the cellular service provider 20 to a data service bureau 24, which then sends the data over the Internet to server computer 22, where it is decoded and loaded into a computer database utilizing an automated software interface. This computer database in server computer 22 is accessible to customers 26 through a web page interface.

Figure 2:
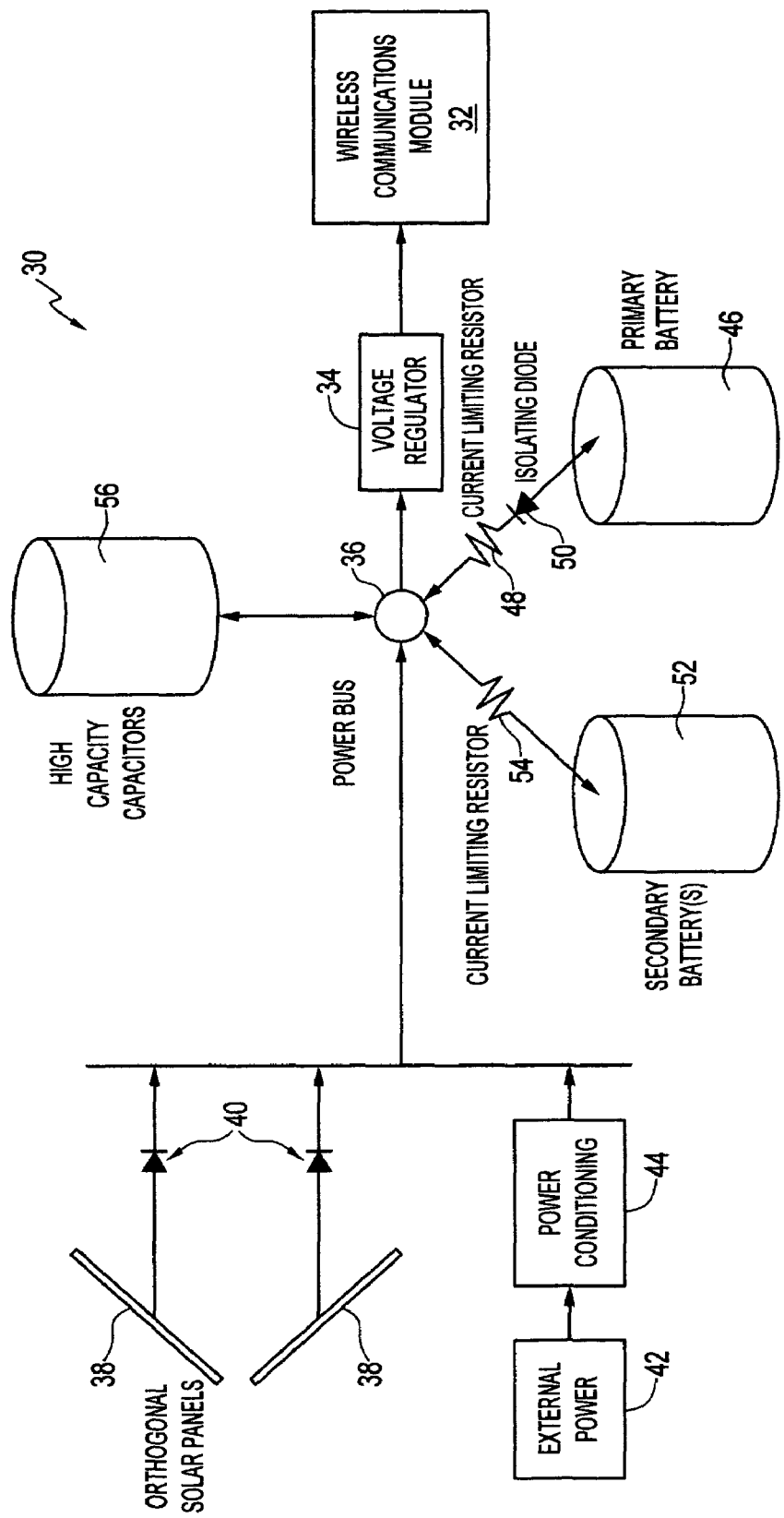
FIG. 2 is a block diagram of the power storage and delivery system of the present invention.

Referring now to FIG. 2, the power storage and delivery system of the present invention is designated generally at 30. In this diagram, only the wireless communications module 32 is shown from the tracking and monitoring unit 10 of FIG. 1. This is because the daily high-current draws of the unit 10, typically in the range of about 2 amperes, occur in the communications module 32. Because the communications module 32 of the telemetry system is a low-voltage system (less than about 12 Volts), a voltage regulator 34 is installed between the power bus 36 and communications module 32. Preferably, voltage regulator 34 maintains an output voltage of 3.3 Volts.

Power from the power bus 36 may come from either a direct source or a storage source, or both. Two examples of direct sources are shown in FIG. 2. First, the tracking unit 10 of FIG. 1 is provided with solar panels 38 oriented orthogonal to each other, to provide the best arrangement for continuous power supply. Solar panels 38 are diode-isolated from power bus 36 by diodes 40, and preferably supply power in the range of 12–18 Volts. Another possible direct source of power is an external power source 42. Certain types of applications of the tracking unit 10 would permit access to standard external power sources, such as a 110-volt AC electrical outlet, for intermittent periods of time. Other possible sources range from 12 Volt DC current to 230 Volt AC current. Because of the large number of potential types of external power sources, external power source 42 supplies power through a power-conditioning unit 44, which will rectify the power (if AC current) and limit the current before the power proceeds to power bus 36.

The storage source of power for power bus 36 includes three different sources. First, a primary battery 46 is provided to provide power to bus 36 and thence to module 32. The use of a primary battery 46 is typical in the prior art, but the drawback of prior art systems is the high-current draw from module 32 on a daily basis. This frequent and periodic high-current load drains primary battery 46 very quickly, thereby requiring replacement at frequent intervals. In the alternative, the industry would typically provide an oversize primary battery in order to extend the replacement intervals for the battery. This in turn, is detrimental to the size and weight characteristics of the tracking unit 10.

In the preferred embodiment of the invention, primary battery 46 is connected to power bus 36 through a current limiting resistor 48 and an isolating diode 50. Diode 50 prevents charging of primary battery 46, while resistor 48 limits the discharge current experienced by the battery, and hence increases its lifetime.

A secondary battery 52 is provided to supply power to bus 36. A current-limiting resistor 54 between the positive terminals of the secondary battery 52 and power bus 36 limits the charge and discharge currents of the secondary battery, thereby extending the life of the secondary battery.

The third source of storage power is a set of high capacity capacitors 56. The capacitors 56 will provide the power during intervals of high-current loads, as the communications module 32 transmits data. This relieves the primary and secondary batteries from this life-shortening task, and further extends the life of the tracking unit 10. Having all three storage systems available allows flexibility in meeting a customer's specific requirements, without redesign. Providing dual capacitor and secondary battery solutions to the primary battery provides a highly reliable unit for the many-year life of the secondary batteries, and then can gracefully degrade to the performance level of a capacitor-only system should the batteries fail to hold their charge.

Figure 3:
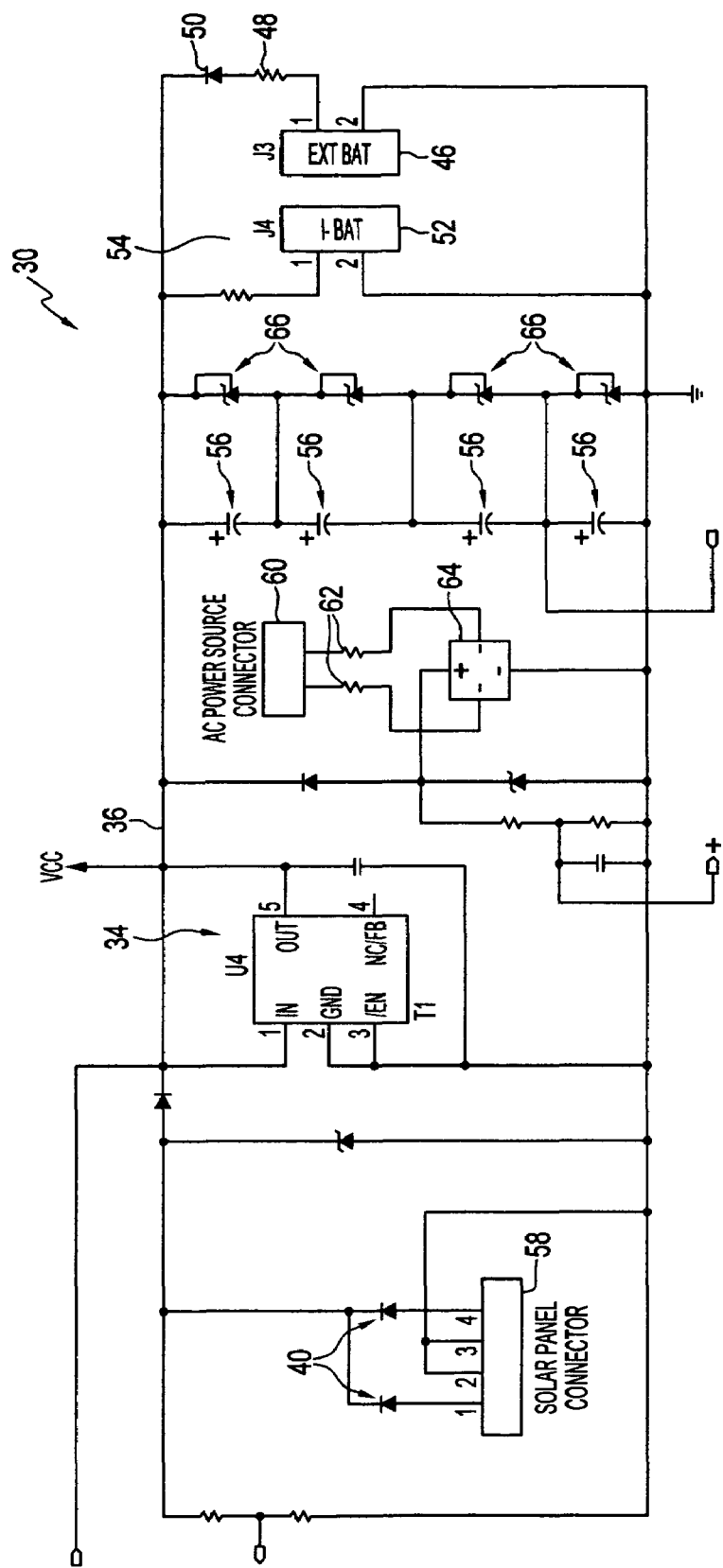
FIG. 3 is an electrical schematic of the preferred embodiment of the invention.

Referring now to FIG. 3, an electrical schematic drawing of a preferred embodiment of a circuit with all of the above-described features is shown. Power bus 36 is depicted as the upper horizontal line in this drawing and is preferably a 10 Volt bus. The power sources (both direct and storage) have a common ground/return. Thus, on the left side of the drawing, the direct power source from solar panels 38 (shown in FIG. 2) is connected to telemetry power system 30 via a connector 58. The positive terminals of the two solar panels are connected through diodes 40 to power bus 36.

The second direct power source is connected to power system 30 via connector 60. Resistors 48 limit the current from source 60, and rectifier 64 transforms AC current to low-voltage DC current upstream of its connection to power bus 36.

The first power storage source, primary battery 46 is shown on the right side of the drawing, with its positive terminal connected to the power bus through resistor 48 and diode 50. Preferably, primary battery 46 is a 9-volt long-life Lithium or Alkaline battery. The second power storage source, secondary battery 52 is shown adjacent primary battery 46, with its positive terminal connected to the power bus through resistor 54. Preferably, secondary battery 52 is an 8–9 volt rechargeable NiMH battery.

The third power storage source is a set of four serially connected low voltage (2.5 volt) high-capacity (at least 10 F.) capacitors 56. It should be noted that capacitors 56 require a means of maintaining a balanced voltage from cell to cell. Prior art efforts disclose the use of a resistor ladder to accomplish this goal. However, the inventor herein has devised a solution by the installation of a series of active shunting components 66, each in parallel with each capacitor. This is superior to the resistor ladder because it only shunts (excess) power when the capacitors are fully charged. In addition the shunts can provide significant bypass current to quickly achieve an exact balance.

The two direct power sources and three storage power sources are all connected to power bus 36, which is in turn connected to the input terminal of voltage regulator 34. Power from voltage regulator 34 is then output to the wireless communications module 32 (shown in FIG. 2) and other desired components via conductor VCC.

Figure 4:
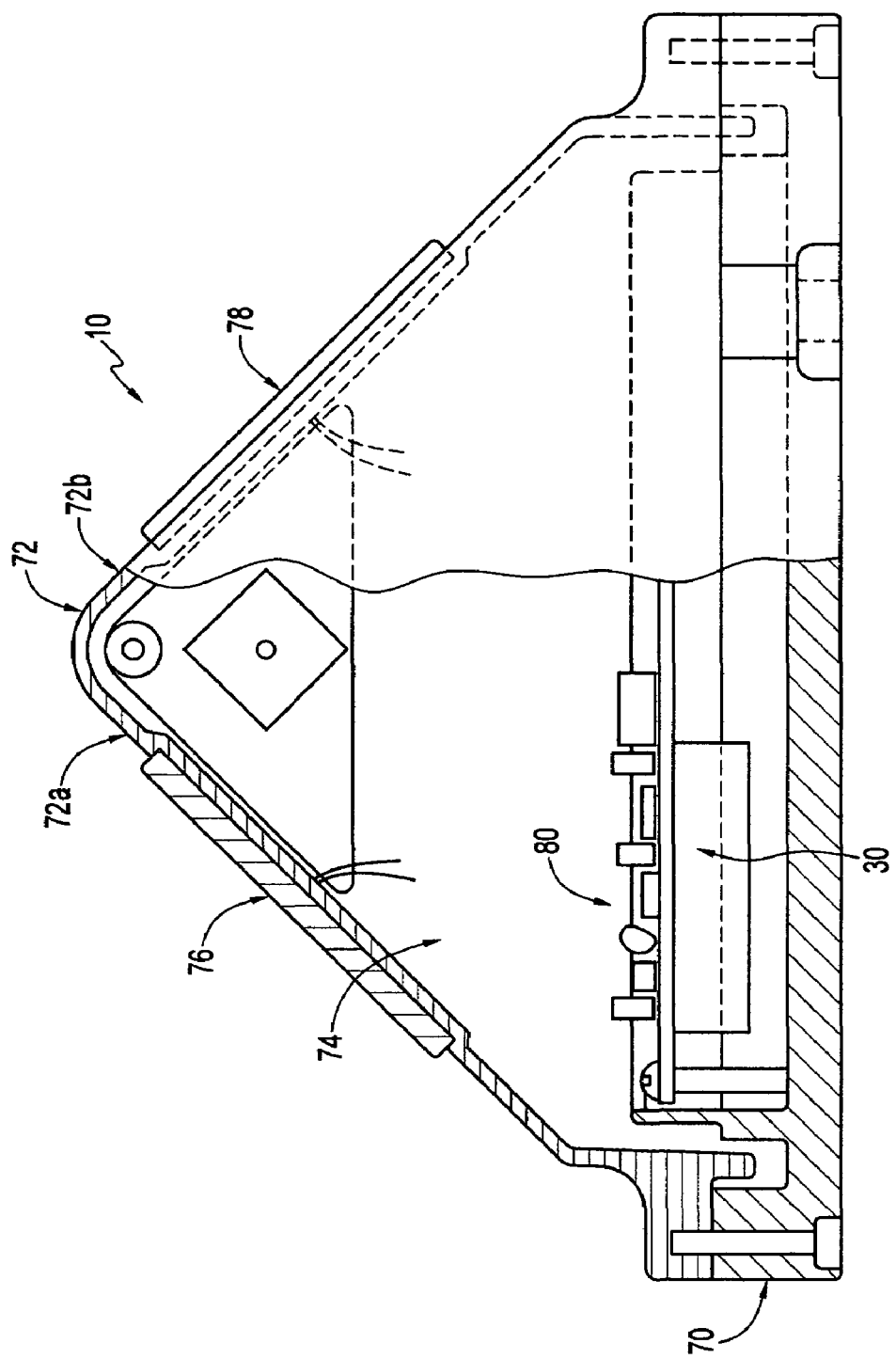
FIG. 4 is an end elevational view of a tracking unit using the power delivery and storage system of the present invention, with portions cut away to reveal the interior of the unit.

Referring now to FIG. 4, one example of a tracking and monitoring unit 10 is shown in more detail, and which incorporates the power delivery and storage system 30 of the present invention. Tracking and monitoring unit 10 includes a base plate 70 designed for attachment to a wide variety of containers and other shipments which are desired to be tracked. An enclosure 72 is screwed to plate 70 and preferably includes a pair of generally orthogonally oriented sidewalls 72a and 72b, forming a hollow cavity 74 having a triangular cross-section.

A pair of solar panels 76 and 78 are mounted to the exterior faces of sidewalls 72a and 72b. Each solar panel 76 and 78 includes a plurality of photoelectric cells, and has a pair of wires extending therefrom to provide a source of intermittent direct electrical power to the tracking unit 10. In addition, the material of sidewalls 72a and 72b is radio frequency transparent, to permit signals from GPS as well as transmissions from the transmitter of the tracking unit to pass through the walls of enclosure 72.

Sidewalls 72a and 72b are connected together along a ridge at approximately a right angle. In this way, vertical orientation of the ridge of tracking unit 10 will maximize the "viewing angles" for solar panels 76 and 78 and thereby double the chance of direct sunlight on one of solar panels 76 and 78 during any random movement of the shipment or vehicle to which the tracking unit 10 is attached.

Enclosure 72 also houses the various electrical components of the tracking unit 10, including power storage and delivery system 30, to thereby protect them from weather and the outdoor environment. These electrical components include wireless communications module 32 (shown in FIG. 2), as well as a GPS receiver, a microprocessor, and various other sensors for detecting a variety of environmental conditions of the tracking unit 10 and the shipment to which it is attached. These electrical components are designated generally at 80 in FIG. 4.

Whereas the invention has been shown and described in connection with the preferred embodiments thereof, many modifications, substitutions and additions may be made which are within the intended broad scope of the appended claims.

What is claimed is:

1. A portable, self-contained, low-voltage power delivery and storage system for a wireless communications unit, comprising:
    a power bus electrically connected to a voltage regulator, for providing low-voltage electrical current to the voltage regulator;
    said voltage regulator electrically connected to the wireless communications unit, for providing constant, low-voltage power thereto;
    said power bus electrically connected to a direct power source and at least three power storage sources, for receiving and distributing a continuous flow of electrical current to the voltage regulator and wireless communications unit;
    said direct power source including a source of intermittently available low voltage DC electrical current;
    said power storage sources including:
        a primary, low-voltage, non-rechargeable battery with a positive terminal connected to the power bus through a current limiting resister and an isolating diode, said resistor limiting current discharged from the primary battery to a level less than the peak load of the wireless communications unit during a periodic transmission;
        a secondary, low-voltage, rechargeable battery with a positive terminal connected to the power bus through a current limiting resistor, said resistor limiting current discharged from the secondary battery to a level less than the peak load of the wireless communications unit during a periodic transmission; and
        a set of low voltage high capacity capacitors connected in series with a positive terminal of the downstream capacitor connected to the power bus, said capacitor set having a current capability sufficient to meet the peak load of the wireless communications unit during a periodic transmission.

2. The system of claim 1, wherein the source of intermittently available low voltage DC electrical current includes at least one solar panel mounted on the unit with a diode interposed between the panel and power bus to isolate the panel from the power bus.

3. The system of claim 2, wherein the solar the source of intermittently available low voltage DC electrical current includes at least a second solar panel mounted on the unit in an orientation orthogonal to the first solar panel, with a diode interposed between the second panel and the power bus to isolate the second panel from the power bus.

4. The system of claim 3, wherein the source of intermittently available low voltage DC electrical current further includes:
    a source of 110-volt AC electrical current, external of the unit;
    a power conditioning apparatus interposed between the AC power source and the power bus, said conditioning apparatus including a rectifier and a current limiter for providing low-voltage DC electrical current to the power bus.

5. The system of claim 4, wherein said set of high capacity capacitors includes means for balancing the voltage among the capacitors, said balancing means including an active shunting component connected in parallel with each of the capacitors in the set.

6. A portable, self-contained tracking and monitoring unit, comprising:
    a hollow enclosure formed of radio-frequency-transparent material;
    a pair of solar panels mounted on the enclosure and having photoelectric cells thereon for converting solar radiation into an electrical current, said solar panels mounted in vertical planes oriented generally orthogonal to one another and electrically connected to a power bus within the enclosure to provide electric current thereto;
    a first sensor mounted within the enclosure and operable to detect predetermined criteria, electrically connected to the power bus;
    a microprocessor mounted within the enclosure, connected to the first sensor and power bus and operable to receive data from the first sensor and process the data into a data packet;
    a wireless communications unit within the enclosure, including a transmitter connected to the power bus and microprocessor and operable to periodically transmit a data packet from the microprocessor to a remote receiving station;
    a voltage regulator interposed between the power bus and the wireless communications unit, for providing continuous low-voltage power to the wireless communications unit;
    said power bus electrically connected to at least three power storage sources, including:
        a primary, low-voltage, non-rechargeable battery with a positive terminal connected to the power bus through a current limiting resister and an isolating diode, said resistor limiting current discharged from the primary battery to a level less than the peak load of the wireless communications unit during a periodic transmission;
        a secondary, low-voltage, rechargeable battery with a positive terminal connected to the power bus through a current limiting resistor, said resistor limiting current discharged from the secondary battery to a level less than the peak load of the wireless communications unit during a periodic transmission; and
        a set of low voltage high capacity capacitors connected in series with a positive terminal of the downstream capacitor connected to the power bus, said capacitor set having a current capability sufficient to meet the peak load of the wireless communications unit during a periodic transmission.

7. The tracking and monitoring unit of claim 6, wherein said first sensor is a GPS receiver operable to receive tracking data from GPS.

8. The tracking and monitoring unit of claim 6, wherein said first sensor is a detection circuit for detecting an environmental condition of the tracking and monitoring unit.

9. The tracking and monitoring unit of claim 8, wherein the environmental condition monitored is an abrupt change in the velocity of the tracking and monitoring unit.

10. The tracking and monitoring unit of claim 8, further comprising a source of intermittently available low voltage DC electrical current electrically connected to the power bus, including:

a source of 110-volt AC electrical current, external of the tracking and monitoring unit; and a power conditioning apparatus interposed between the AC power source and the power bus, said conditioning apparatus including a rectifier and a current limiter for providing low-voltage DC electrical current to the power bus.

11. The system of claim 6, wherein said set of high capacity capacitors includes means for balancing the voltage among the capacitors, said balancing means including an active shunting component connected in parallel with each of the capacitors in the set.

* * * * *